United States Patent [19]
Eiberger

[11] Patent Number: 4,789,908
[45] Date of Patent: Dec. 6, 1988

[54] DISTORTION REDUCTION CIRCUIT FOR VIDEO PLAYBACK

[75] Inventor: Berthold Eiberger, Darmstadt, Fed. Rep. of Germany

[73] Assignee: Robert Bosch GmbH, Stuttgart, Fed. Rep. of Germany

[21] Appl. No.: 46,997

[22] Filed: May 5, 1987

[30] Foreign Application Priority Data

May 7, 1986 [DE] Fed. Rep. of Germany ....... 3615467

[51] Int. Cl.$^4$ .......................... G11B 15/14; G11B 5/02
[52] U.S. Cl. ......................................... 360/65; 360/67
[58] Field of Search ..................... 360/36.2, 46, 67, 65

[56] References Cited

U.S. PATENT DOCUMENTS

| 4,093,965 | 6/1978 | Gish | 360/65 |
| 4,122,502 | 10/1978 | Kobayashi | 360/65 |
| 4,314,288 | 2/1982 | Gyi | 360/65 |

OTHER PUBLICATIONS

"Rauschoptimierung bei der digitalen Magnetbandaufzeichnung" (Noise Optimization at Digital Video Tape Recording), Von Berthold Eiberger, 1984, Frequenz, pp. 306–312 (English abstract).

*Primary Examiner*—Vincent P. Canney
*Attorney, Agent, or Firm*—Frishauf, Holtz, Goodman & Woodward

[57] ABSTRACT

The correction of broadband signals reproduced from magnetic tape are corrected for distortion by three stages in cascade, which the first serves to correct distortion in the group propagation time through the system of playback magnetic head and playback preamplifier, the second directs for amplitude distortion including a 90° phase rotation and the third stage provides equilization to compensate for high frequency losses.

6 Claims, 8 Drawing Sheets

DISTORTION REDUCTION CIRCUIT FOR VIDEO PLAYBACK

This invention concerns a circuit for reducing or removing distortion in the reproduction of tape-recorded broadband signals, particularly digitally coded television signals.

Because of the broadband character of the transmitted signals, in magnetic tape recording of digitally coded video signals, the steps of signal processing in reproduction from the tape record have important influence on the quality of the digital signals produced from the recording, i.e., with regard to the obtainable bit error rate.

Whereas in magnetic recording of video signals with analog technology, where it is important to eliminate the d.c. components frequency modulated signals are recorded at about 14 MHz bandwidth and with a lower cut-off frequency of about 500 kHz, the bandwidth requirements of a transmission channel for processing digitally coded video signals is considerably higher. Thus, in the conventional recording standard, the ratio of upper to lower cut-off frequency is about 300 and the signal bandwidth per recording channel 50 MHz. From such requirements there results a lower cut-off frequency of 166 kHz. Allowing something for some reserve capacity, this means a need for more than three frequency decades for signal processing.

SUMMARY OF THE INVENTION

It is accordingly an object of the invention to provide a distortion reduction or elimination structure that produces the required broadband signal distortion reduction and at the same time does not provide any deterioration of the signal to noise margin that is worth mentioning.

Briefly, there is first provided a distortion removal stage at the output of the playback preamplifier for removing distortion resulting from the group propagation time through the system composed of playback magnetic head and playback preamplifier; then a following stage provides for correction for amplitude distortion by integration and the 90° phase rotation connected therewith, and a final equalizing state is provided for compensating high frequency losses.

It has long been known in the technology of broadband recording on magnetic record media, for example magnetic tape, that both the amplitude and the phase of the reproduced signal fluctuate in a manner dependent on the signal frequency. These effects are referred as the frequency characteristic in amplitude and the frequency characteristic in phase. For obtaining a signal from a magnetic record medium that corresponds accurately to the recorded signal, it is necessary to provide equalization, or compensation for the effect of the variations in amplitude and phase transmission of different frequencies. This takes place in general in distortion compensating networks, a large number of which are known, which are connected to follow the reproducing magnetic head and to smooth out the signal characteristic by a reciprocal frequency characteristic.

The requirement of unusually broadband treatment in the processing of digitally coded video signals sharpens the requirement for the distortion reduction apparatus that is to be used.

Figure 1:
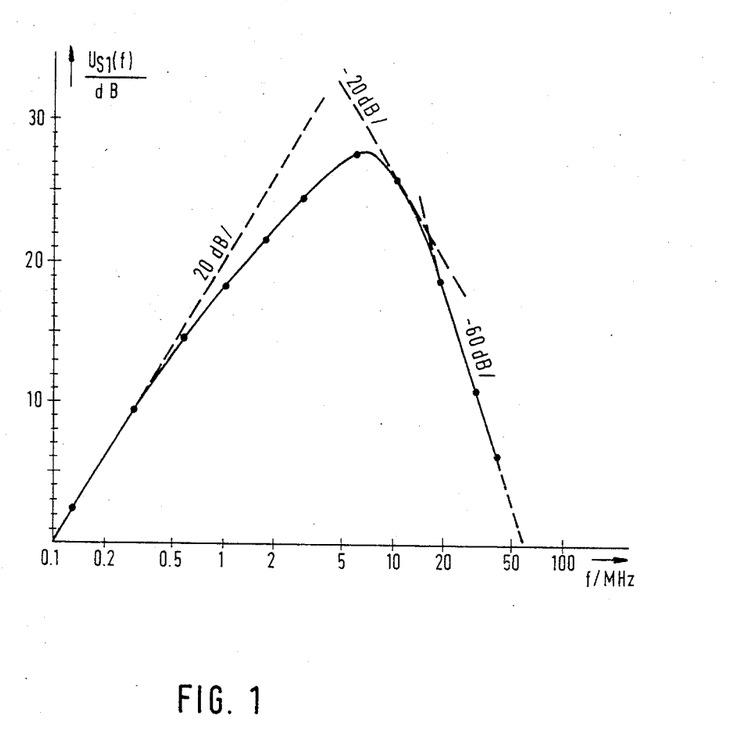
FIG. 1 as already mentioned, shows the amplitude/frequency characteristic found at the output of the playback preamplifier.

In the reproduction of signals from a magnetic record by means of a magnetic head sensitive to changes in flux, a rise of signal voltage of 20 dB for each frequency decade theoretically takes place. In practice, this basic course of the amplitude characteristic is affected by the gap characteristic of the magnetic head that is used, the self-demagnetization effect, head-to-tape adjustment errors and, finally, losses resulting from insufficient head-tape contact (sometimes referred to as spacing losses). The resulting overall frequency characteristic in terms of amplitude, shows the rise from the lower limit frequency at about 20 dB per frequency decade, after which the various loss factors make a contribution so that the rate of rise slows down and a signal voltage maximum is reached. Therafter, the signal voltage falls, at first at 20 dB per frequency decade towards higher frequencies and at the highest frequencies at 60 dB per decade. The basic course of the resulting signal voltage curve is shown in FIG. 1.

The circuit of the invention provides a phase characteristic with respect to frequency that is inverse to the phase-frequency characteristic of the system composed of the playback magnetic head and the playback preamplifier. The more detailed makeup of the circuit of the invention will be apparent from the detailed description that follows.

BRIEF DESCRIPTION OF THE DRAWINGS

The invention is further described by way of illustrative examples with reference to the annexed drawings, in which.

DESCRIPTION OF THE ILLUSTRATED EMBODIMENTS

Figure 3:
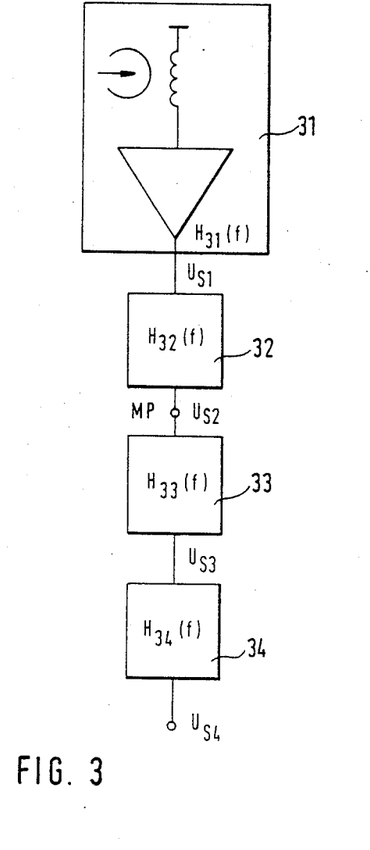
FIG. 3 is a circuit block diagram of a circuit according to the invention for signal processing.

FIG. 3 represents the circuit block diagram of the signal processing in a system 31 consisting of a video playback magnetic head and a playback preamplifier. The necessary removal of distortion is performed in three stages 32, 33 and 34. In the first of these, the stage 32 connected directly following the preamplifier, there is removal of distortion of the group propagation time through the system 31. In the next stage 33, there is removal of amplitude distortion by integration and the 90° phase rotation connected therewith. In the last stage 34, there is final removal of amplitude distortion.

Figure 4:
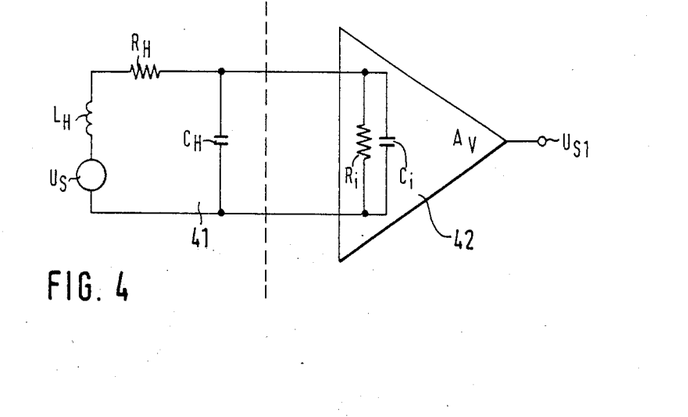
FIG. 4 shows the electrical equivalent circuit of the playback magnetic head and of the playback preamplifier, as well as the amplitude/frequency characteristic and the group propagation time of the transmission function from which distortion is to be removed.

FIG. 4 is an electrical equivalent circuit of a conventional type representing the coupling of the playback magnetic head to the playback preamplifier. As already fully described in the literature, e.g., Zeitschrift Frequenz, Jg 38 (1984), issue 12, pp. 306–312, the equivalent circuit of the playback magnetic head 41 can be drawn as a damped parallel-resonant circuit, composed of the inductance $L_H$ connected in series with the signal source $U_S$ and likewise in series with a resistance $R_H$ and, in parallel to that series circuit of $U_S$, $L_H$ and $R_H$, the combined winding capacitance and circuit capacitance $C_H$. The playback preamplifier 42 is fully described by its input impedance (including the input resistance $R_i$) and, in parallel thereto, the input capacitance $C_i$. The amplification factor $A_V$ also needs to be taken into account in this complete desription.

The amplification of the system 31 (FIG. 3) corresponding to playback head with playback amplifier (FIG. 4) can then be described as follows.

$$\frac{U_{S1}}{U_S} = V_{31}(f) = \qquad (1)$$

$$A_V \frac{R_i}{(R_H + j2\pi f L_H) \cdot [1 + j2\pi f R_i(C_H + C_i)] + R_i}$$

In a single low-noise transistor stage, it is possible to obtain values of 25 to 35 dB for the amplification $A_V$ over the entire necessary bandwidth of 50 MHz.

In the first stage 32 of the three stage playback distortion-removing structure of FIG. 3, the amplified signal $U_{S1}$ can be corrected down to minimum phase errors by removal of distortion of the group propagation time produced by the system 31, if the following holds for its distortion removing transfer factor $H_{32}(f)$:

$$H_{32}(f) = \frac{A_V}{V_{32}(f)} \qquad (2)$$

In that way an optional overall correction is provided for all phase errors which owe their presence to the coupling of the playback head 41 with its complex impedance at the input of the playback preamplifier 42. Furthermore, a certain amplitude rise results from this distortion removal step. In one investigated case, an amplitude enhancement of about 10 dB appeared between the lower and upper band limits while at the same time, a propagation time correction of 11.4 ns was produced within the frequency range of interest.

Figure 5:
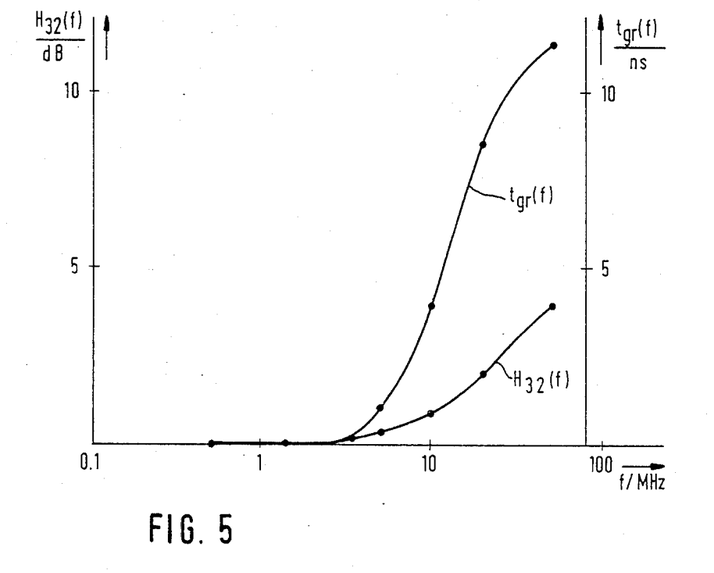
FIG. 5 schematically shows the amplitude/frequency characteristic and the propagation time of the transfer function $H_{32}(f)$.

FIG. 5 shows the course of the amplitude/frequency characteristic and of the group propagation time of the first distortion reduction stage 32.

Figure 6:
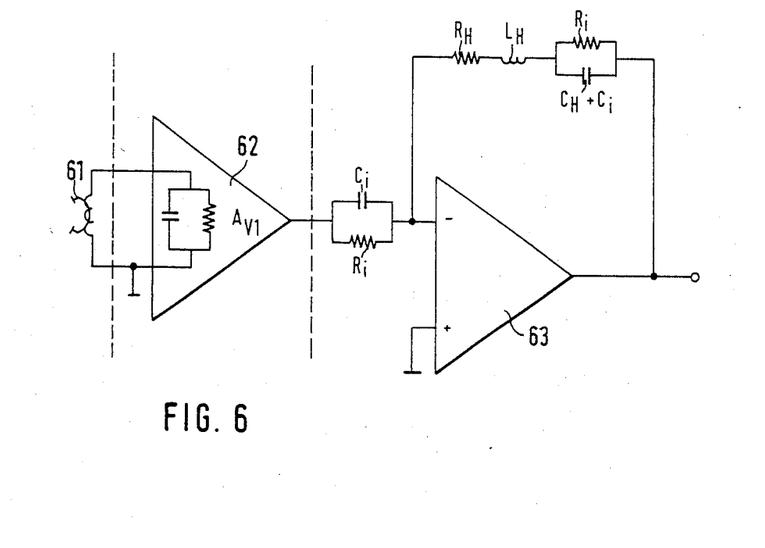
FIG. 6 schematically shows a circuit compensating for group propagation time connected to follow the playback preamplifier.

FIG. 6 schematically shows a circuit for phase distortion removal corresponding to the distortion removal stage 32 of FIG. 3, which was designed according to the above-described analysis of the playback system to be corrected. The equivalent circuit of the video playback magnetic head 61 with the playback amplifier 62 coupled thereto corresponds to that of FIG. 4.

In order to obtain a stage having a frequency characteristic which is the reciprocal of the phase/frequency characteristic of the sytem composed of the playback magnetic head 61 and the playback preamplifier 62 connected thereto, the inverting input of a differential amplfier 63 is connected to the output of that differential amplifier through a simulation of the input impedance of the playback preamplifier 62. This input impedance consists, according to FIG. 4, of the parallel connection of the input resistance $R_i$ and the input capacitance $C_i$. The output of the differential amplifier 63 is thus fed back to the inverting input, as already mentioned. The feedback branch consists of a simulation of the input circuit of the electrical equivalent circuit of FIG. 4, in the illustrated case composed of the series connection of the loss resistance $R_H$, the inductance $L_H$ of the playback magnetic head and a parallel connection of the input resistance $R_i$ of the preamplifier with the sum of circuit capacitance $C_H$ and input capacitance; $C_i$1. The noninverting input of the differential amplifier 63 is connected to fixed potential. The amplification $A_{V2}$ of the circuit for signal distortion removal at least unity, i.e. $A_{V2} \geq 1$.

The value of the loss resistance $R_H$ varies in a manner dependent upon frequency. For that reason, the circuit for distortion removal in accordance with FIG. 7 modifies the circuit of FIG. 6 as follows. The coupling of the differential amplifier 73 to the output of the playback preamlifier is performed in the same way as for the differential amplifier 63 of FIG. 6 and here also its noninverting input is connected to fixed potential as in FIG. 6. The feedback branch from the output of the differential amplifier 73 to its inverting input has a series connection of two parallel combinations. In a first parallel combination there is, in the same way as in the circuit of FIG. 6, a simulation of the input resistance $R_i$ of the playback preamplifier and the total capacitance $C_H + C_i$. In the second parallel circuit the loss resistance ($R_H$ in FIG. 6) is simulated by a partial resistace $R_{HS}$ connected in series to the inductance $L_H$ of the playback magnetic head and a partial resistance $R_{HP}$ connected in parallel to the above-described series circuit. Tne inductance $L_H$ is advantageously provided by a low-loss coil.

Figure 7:
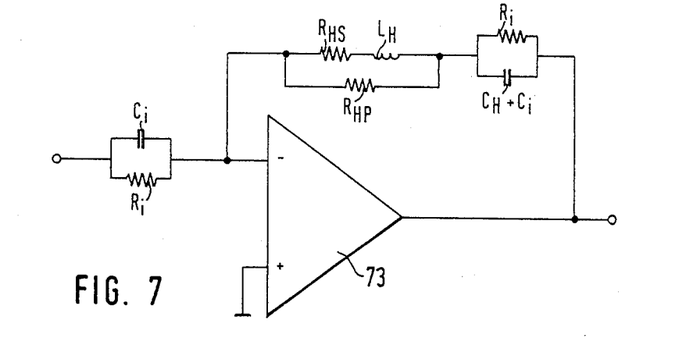
FIG. 7 shows another embodiment of a circuit for group propagation time distortion-correction, omitting the first of the stages shown in FIG. 6.
Figure 8:
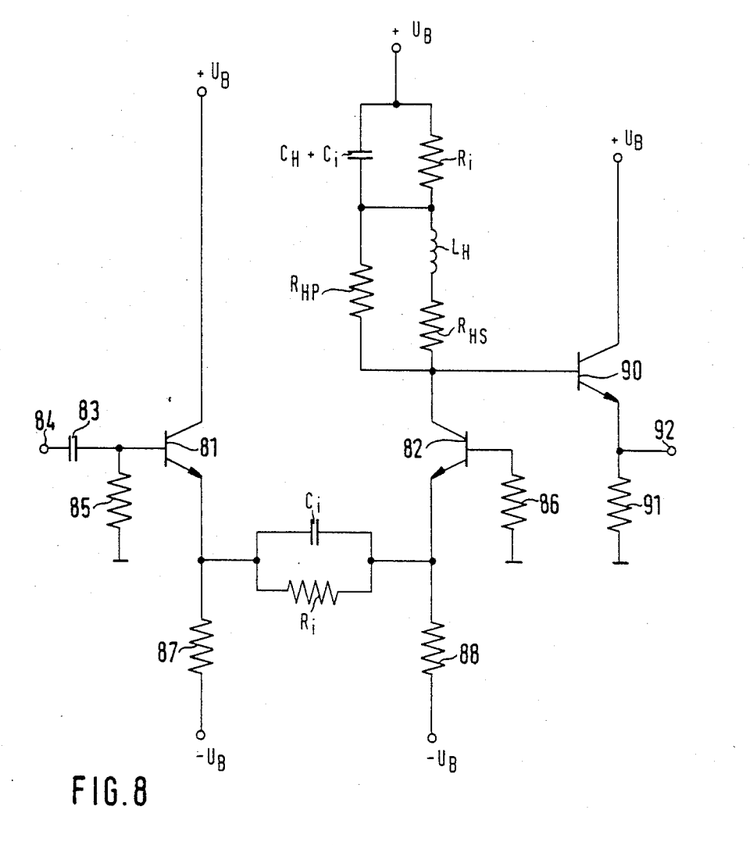
FIG. 8 shows a practical embodiment of the basic circuit of FIG. 7.

The circuit of FIG. 8 corresponds in its electrical behavior to that of FIG. 7, but this embodiment operating as an amplifier without feedback, contributes to the stability of the circuit.

The differential amplifier operating as the input portion of the circuit of FIG. 8 consists of two NPN transistors 81, 82, the emitters of which in each case are connected with a voltage source $-U_B$. The base of the transistor 81 is connected through the coupling capacitor 83 with the circuit input 84, i.e., with the output of the playback preamplifier, which itself is not shown. The bases of both transistors 81 and 82 are connected to ground through the respective base resistances 85 and 86. The collector of the transistor 81 is directly connected to the feed voltage $+U_B$, while the collector of the transistor 82 is connected through a circuit composed of passive components which corresponds exactly to the series connection of two parallel circuits in the feedback branch of the differential amplifier 73 in FIG. 7, connected to the positive voltage source $+U_B$.

The above-mentioned series connection of two parallel circuits consists of a first parallel branch, in which is contained the sum capacitance $C_H + C_i$ as well the loss resistance portion $R_{HP}$, whereas the second branch has a simulation of the input resitance $R_i$ and of the magnetic head inductance $L_{HS}$ and the second part of the loss resistance $R_{HS}$. Between the resistance $R_i$ and the inductance $L_H$, as well as between the sum capacitance $C_H + C_i$ and the partial resistance $R_{HP}$ the two parallel branches are connected with each other for constituting the series circuit of the two parallel combinations.

The emitters of the two transistors 81 and 82, are respectively connected through emitter resistances 87 and 88 with the negative pole of the operating voltage source, e.g., with $-U_B$. The emitters of the two transistors 81 and 82 are furthermore connected together through a simulation of the input impedance of the playback preamplifier. This simulation of the input impedance consists of a parallel circuit of the input resistance $R_i$ and the input capacitance $C_i$.

At the output of the differential amplifier input stage built around the transistors 81 and 82, a further amplifier stage is connected. Another NPN transistor 90 is provided there connected in such a way to the collector of the transistor 82 that the base of the transistor 90 is connected with the collector of the transistor 82 galvanically. The collector of the transistor 90 is further galvanically connected to the positive voltage supply plus $U_B$. The emitter of the transistor 90 is grounded to the emitter resistance 91 so that the output signal can be obtained from the signal output 92 connected this emitter.

The broadband signal processing thus performed for removal of phase distortion reduces the following stages to an integration of the signal with a phase rotation by 90° connected therewith and then a pure shaping of the amplitude/frequency characteristic in the following stage for removal of the corresponding kind of distortion. These following stages may be of conventional design, but their operating parameters must of course be fitted to the overall plan of FIG. 3 as will now be outlined.

Figure 2:
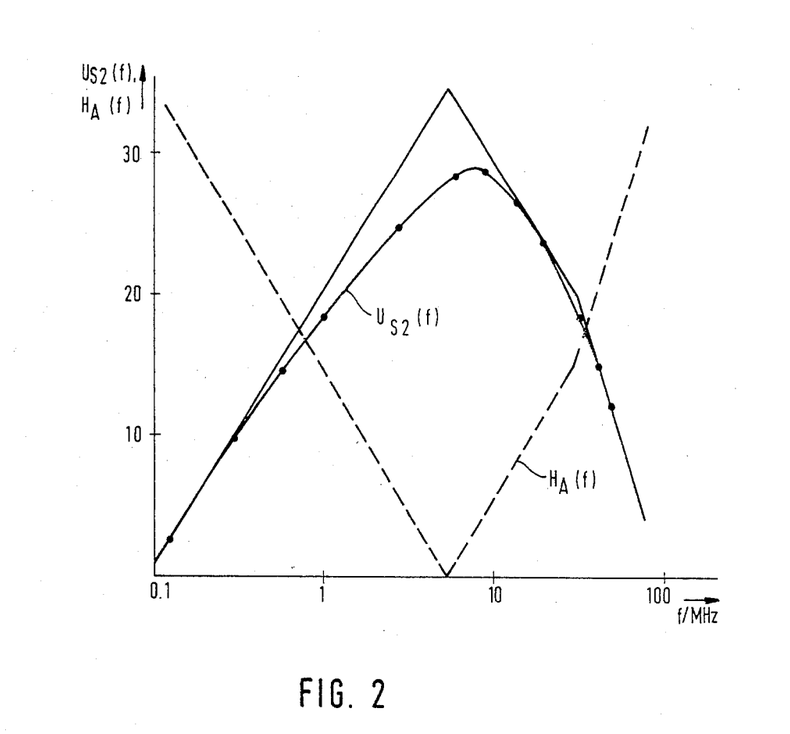
FIG. 2 shows the Bode diagram for determination of the residual amplitude distortion.

FIG. 2 shows the resulting amplitude/frequency characteristic at the measurement point MP together with approximations illustrated in FIG. 1. The broken line represents the inverse of the frequency characteristic approximation, hence the transmission function of the required amplitude distortion elimination in the rest of the distortion remover. The transfer function $H_A(f)$ in all of these H functions on the same level as the $H'_A$ obtained from FIG. 2 is as follows:

$$H_A(f) = \frac{1}{jaf} \cdot (1 + bf^2) \cdot (1 + cf^2) \quad (1)$$

where for the amplitude distortion removal with 90° rotation $H'_{33}(f)$ we have $$H'_{33}(f) = 1/jaf \quad (2)$$

and for the phase, linear high frequency enhancement holds, thus:

$$H'_{34}(f) = (1 + bf^2) \cdot (1 + cf^2) \quad (3).$$

Obtaining the transfer function $H'_{33}(f)$ involves the necessary integration which compensates for the differentiation in the reading process. The transfer function $H'_{34}(f)$ consists of two double differentiation boost circuits in cascade with different cut-off frequencies.

If now this structure is used for distortion removal from broadband signals, very high requirements are imposed on the realization of the integrator with the transfer function $H'_{33}(f)$:

the integrator must operate in correct amplitude and phase over three decades of frequency, and the amplitude range of operation of the integrator must extend over more than 60 dB.

It is evident that with these requirements for the integrator some noise optimization of the circuit must be accomplished. A low noise broadband amplifier reaches an idling amplification at the lower end limit $f_u = 50$ kHz of 40 dB in the most favorable case. There is then produced at the maximum signal frequency $f_{so} = 50$ MHz an amplitude reduction of $-20$ dB when the integrator operates over three frequency decades. This integrating stage therefore impairs the signal-to-noise margin already obtained after the preamplifier.

For these reasons the required transmission function $H_{33}(f)$ and $H_{34}(f)$ are given practical expression as follows:

$$H_{33}(f) = \frac{(1 + bf^2)}{jaf} \quad (4)$$

$$H_{34}(f) = 1 + cf^2. \quad (5)$$

Rearrangement of equation (4) gives the result:

$$H_{33}(f) = -j\left[\frac{1}{af} + \frac{b}{a} \cdot f\right]. \quad (6)$$

The transfer function $H_{33}(f)$ therefore provides the necessary 90° rotation for the entire transmission range. The practical embodiment according to (4) differs from what is represented by (2) in that a differentiator is provided in parallel to the integrator and has an effect that is of equal magnitude to that of the integrator already at $f = \sqrt{1/b}$ and rises further towards the band limit. As a result the requirements for the integrator are comparatively simple:

integrating behavior in the 50 kHZ–10 MHz frequency range working amplitude range about 46 dB.

By correspondingly careful selection of the circuit concepts and components the result can be obtained that the signal to noise margin of the reproduced signal is not determined by the integrator that is required, but is unquestionably set in the preamplifier. In other words, there is no deterioration of the noise figure following the preamplifier. The concluding amplitude distortion removal by means of the transmission function $H_{34}(f)$ can be carried out according to the current state of the art. Thus, rearrangment of (5) gives $$H_{34}(f) = 1 - (j\sqrt{c}f).(j\sqrt{c}f) \quad (7).$$

From the foregoing expression the practical embodiment of the desired transmission function directly follows: cascaded differentiating stages each with the transmission function $j \cdot \sqrt{c} f$ which provide, together with the constant, a rise with increase of frequency.

Figure 9:
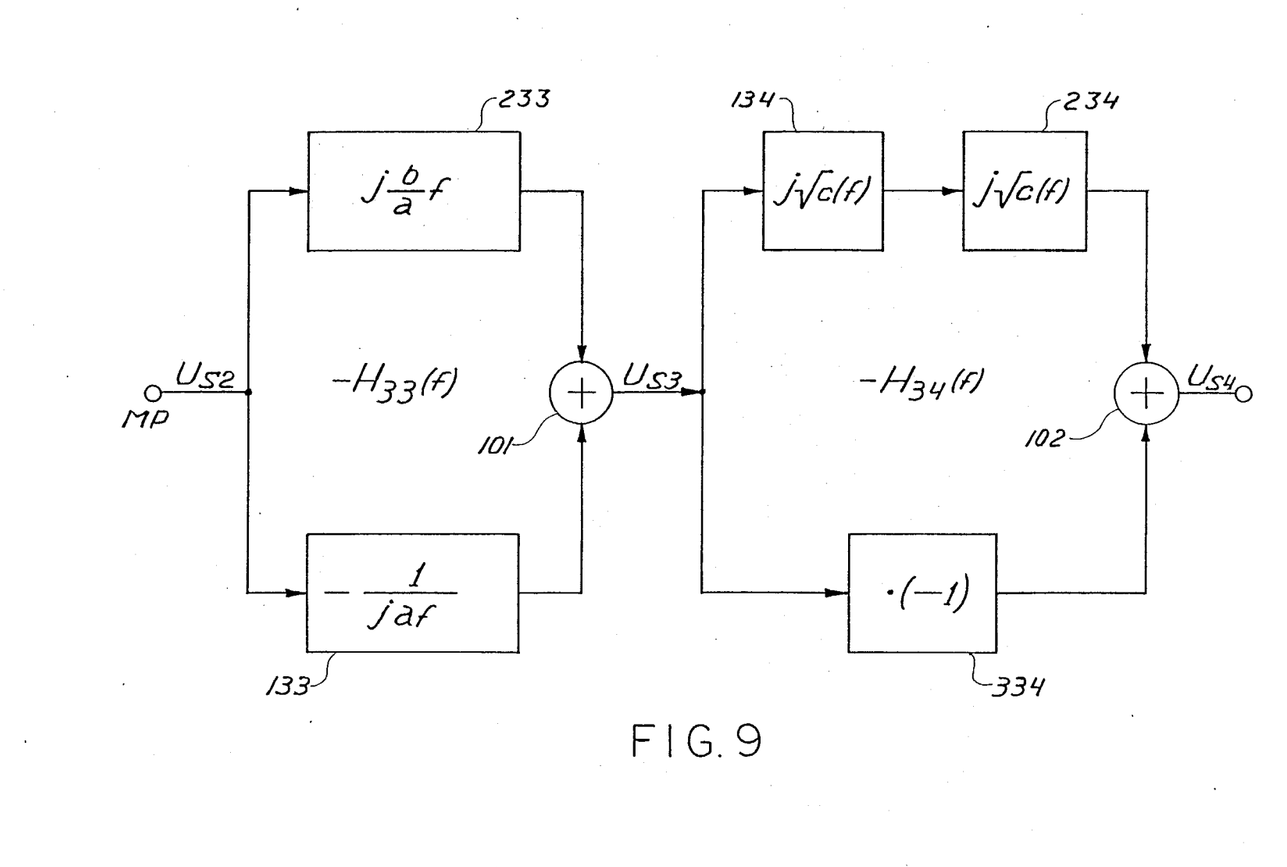
FIG. 9 shows a circuit block diagram of the last two stages of FIG. 3 as developed by circuit analysis for broadband low-noise requirements.

FIG. 9 shows in circuit block diagram the above-described practical embodiments of the circuits 33 and 34 of FIG. 3 beginning with the circuit point MP of FIG. 3 which can, for example, be the output 92 of the circuit of FIG. 8.

Thus, in FIG. 9, for providing the transfer function $H_{33}$ according to equations (4) and (6) there are the inverting integrator 133 and the differentiator 233. Likewise, for providing the transfer function $H_{34}$, there are the cascaded differentiation stages 134 and 234 in addition to the stage 334 according to equation (7).

Figure 10:
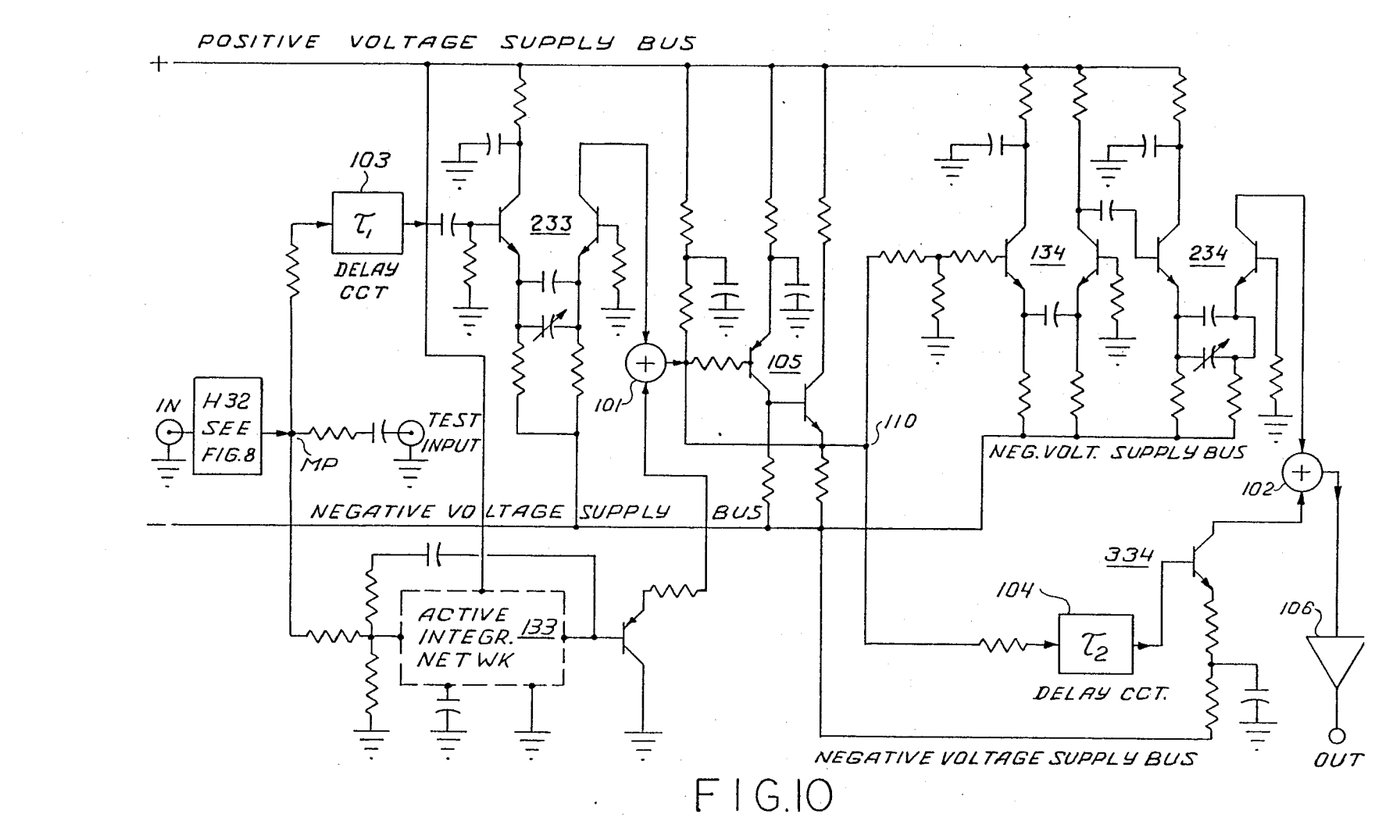
FIG. 10 shows a practical implementation of the circuit of FIG. 9.

There are of course a wide variety of integrating and differentiating circuits known, both active and passive. Of course it is common practice to save space for such circuits by using resistance-capacitance networks and active circuits utilizing transistors which are convenient for containing signal levels. FIG. 10 is a typical practical embodiment of FIG. 9 which is presently preferred. The operating parameters of the various circuit blocks have already been discussed and the circuit connections shown in FIG. 10 are mostly self-explanatory.

FIG. 10 shows an amplifier 105 inserted between the summing connection or circuit 101 and the branching point 110 from which the inputs of the circuits 134 and 334 are supplied. An amplifier 106 of the same kind as the amplifier 105 is provided between the output of the summing connection or circuit 102 and the output of the overall circuit which, as shown in FIG. 9 delivers the voltage signal $U_{S4}$ which is also identified as an output in FIG. 3. 134 and 234 designate resistance-capacitance active networks utilizing emitter-coupled transistor pairs. The integrating active network 133 utilizes a commercially available active network, supplemented with some additional resistances and a feedback capacitance and followed by an output transistor. FIG. 10 also shows the compensating delay circuits 103 and 104 used in each case to balance the propagation time of two circuit branches that are later recombined in a following summing connection or circuit. These are not usually shown in simplified drawings, but are understood as being necessary in braodband circuits. On the input side of FIG. 10, it is shown that the circuit preceding the circuit point MP is one of the kind shown in FIG. 8.

Although the invention has been described with reference to a particular illustrative embodiment, it will be understood that variations and modifications are possible within the inventive concept.

I claim:

1. Apparatus for removal of distortion from broadband signals reproduced from a magnetic tape record by a playback apparatus including a magnetic head signal pick-up means and a preamplifier for amplifying the output of said pick-up means, said distortion removal apparatus including:
   a first stage having an input connected to said preamplifier for compensatory removal of distortion of said signals which was caused by distortion of group propagation signal time of signal components passing through said pick-up means and said preamplifier, and for providing a first partially distortion-corrected signal at an output of said first stage;
   a second stage, having an input connected to said output of said first stage, for providing reduction of signal amplitude distortion and at the same time providing 90° phase rotation and for providing a second partially distortion-corrected signal at an output of said second stage, and
   a third stage, having an input connected to the output of said second stage, for compensation of high frequency signal amplitude with linear phase characteristic.

2. Apparatus according to claim 1, wherein said first stage comprises a differential amplifier having a non-inverting input connected to fixed potential and an inverting input galvanically connected to the output of said preamplifier through a circuit similating the input impedance of said preamplifier and having a feedback connection from the output of said differential amplifier to said inverting input thereof through an electrical network simulating the coupling impedance of the system composed of said pick-up means and said preamplifier, whereby said first stage has a phase characteristic with respect to frequency which is substantially the inverse of said phase characteristic with respect to frequency of said pickup and preamplifier system.

3. Apparatus according to claim 2, wherein said feedback connection of said differential amplifier (63) comprises a series circuit composed of, in series, a resistance representative of the loss resistance ($R_S$) of said pick-up means, an inductance ($L_H$) representative of the inductance of said pick-up means and a parallel circuit combination having in one parallel branch a resistance representing the input resistance ($R_i$) of said preamplifier and in the parallel branch a capacitance representative of the sum of the capacitance ($C_H$) of said pick-up means and the input capacitance ($C_i$) of said preamplifier.

4. Apparatus according to claim 2, wherein said feedback connection of said differential amplifier (73) comprises a series circuit composed of, in series, a first parallel circuit combination of a first resistance ($R_{HP}$) and a series combination, in shunt with said first resistance, of a second resistance ($R_{HS}$) said first parallel circuit combination being representative of the resistance and inductance of said pick-up means, and an inductance ($L_H$) and a second parallel circuit combination having in one parallel branch a resistance representing the input resistance ($R_i$) of said preamplifier and in the parallel branch a capacitance representative of the sum of the capacitance ($C_H$) of said pick-up means and the input capacitance ($C_i$) of said preamplifier.

5. Apparatus according to claim 1, wherein said first stage comprises a differential amplifier of the emitter-coupled type (81-88) wherein emitter coupling is provided by a resistance representative of the input resistance of said preamplifier and a capacitance ($C_i$) in parallel therewith which is representative of the input capacitance of said preamplifier and wherein an output transistor pair of emitter-coupled transistors has a collector load impedance composed of, in series, a first parallel circuit combination of a first resistance ($R_{HP}$) and a series combination, in shunt with said first resistance, of a second resistance ($R_{HS}$) said first parallel circuit combination being representative of the resistance and inductance of said pick-up means, and an inductance ($L_H$) and a second parallel circuit combination having in one parallel branch a resistance representing the input resistance ($R_i$) of said preamplifier and in the parallel branch a capacitance representative of the sum of the capacitance ($C_H$) of said pick-up means and the input capacitance ($C_i$) of said preamplifier and the input collector of said output transistor being connected to the control electrode of a second output transistor.

6. Apparatus according to claim 1, wherein said second stage comprises, connected between said input and said output of said second stage a parallel circuit combination of an inverting integrator and a non-inverting differentiator, the respective outputs of which are summed algebraically to provide said second partially distortion corrected signal at said output of said second stage.

* * * * *